(12) United States Patent
Bretschneider et al.

(10) Patent No.: US 10,974,385 B2
(45) Date of Patent: Apr. 13, 2021

(54) REDUNDANT, DIVERSE COLLISION MONITORING

(71) Applicant: Siemens Aktiengesellschaft, Munich (DE)

(72) Inventors: Jochen Bretschneider, Owingen (DE); Jörg Handeck, Erlangen (DE); Steffen Mihatsch, Renningen (DE); Steffen Schmauder, Renningen (DE); Curd Weber, Sulzfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/647,347

(22) PCT Filed: Aug. 28, 2018

(86) PCT No.: PCT/EP2018/073068
§ 371 (c)(1),
(2) Date: Mar. 13, 2020

(87) PCT Pub. No.: WO2019/052803
PCT Pub. Date: Mar. 21, 2019

(65) Prior Publication Data
US 2021/0060776 A1    Mar. 4, 2021

(30) Foreign Application Priority Data

Sep. 15, 2017  (EP) ..................................... 17191340

(51) Int. Cl.
*B25J 9/16*    (2006.01)

(52) U.S. Cl.
CPC ........... *B25J 9/1666* (2013.01); *B25J 9/1676* (2013.01); *B25J 9/1694* (2013.01)

(58) Field of Classification Search
CPC ...... B25J 9/1602; B25J 9/1605; B25J 9/1643; B25J 9/1666; B25J 9/1676
See application file for complete search history.

(56) References Cited

U.S. PATENT DOCUMENTS

2012/0327190 A1    12/2012  Massanell

FOREIGN PATENT DOCUMENTS

| CN | 204397909 U | 6/2015 |
|---|---|---|
| CN | 205043763 U | 2/2016 |

(Continued)

OTHER PUBLICATIONS

PCT International Preliminary Examination Report and Written Opinion of International Examination Authority dated Dec. 21, 2018 corresponding to PCT International Application No. PCT/EP2016/068944 filed Aug. 28, 2018.

*Primary Examiner* — Spencer D Patton (57) ABSTRACT

Movable elements of a machine are moved by a control device of the machine by controlling drives of the machine. To monitor the movement of the movable elements for collision with each other or with a stationary element, two monitoring devices check, independently from each other, using a computer program, whether there is a risk of collision in the working space. Depending on whether the monitoring devices detect a risk of collision or not, they intervene, independently from each other, in a corrective manner, in the control of the drives or not, and/or independently emit an alarm message or not. The two computer programs are designed in a diverse manner. The two monitoring devices differ from one another. One monitoring device is identical to the control device, while the other monitoring device is embodied as an industrial PC with a data link to the control device.

10 Claims, 7 Drawing Sheets

(56) References Cited

FOREIGN PATENT DOCUMENTS

| | | |
|---|---|---|
| DE | 102007059481 A1 | 6/2009 |
| DE | 102010002250 A1 | 8/2011 |
| EP | 1367314 A2 | 12/2003 |
| WO | WO 9929474 A2 | 6/1999 |
| WO | WO 2012080130 A1 | 6/2012 |

REDUNDANT, DIVERSE COLLISION MONITORING

CROSS-REFERENCES TO RELATED APPLICATIONS

This application is the U.S. National Stage of International Application No. PCT/EP2018/073068, filed Aug. 28, 2018, which designated the United States and has been published as International Publication No. WO 2019/052803 and which claims the priority of European Patent Application, Serial No. 17191340.3, filed Sep. 15, 2017, pursuant to 35 U.S.C. 119(a)-(d).

BACKGROUND OF THE INVENTION

The present invention is based on a monitoring method for a movement of movable elements of a machine, wherein the movable elements are moved by a control device of the machine by controlling drives of the machine,
wherein a first monitoring device
checks whether there is a risk of a collision of a movable element of a machine with another movable element of a machine or with a stationary element, and
depending on whether it detects the danger of a collision or not, it intervenes in a corrective manner into the control of the drives or outputs or does not output an alarm message to an operator of the first monitoring device
wherein a second monitoring device
likewise checks whether there is a risk of a collision of a movable element of the machine with another movable element of the machine or with a stationary element, and
depending on whether it detects the danger of a collision or not, intervenes independently of the first monitoring device likewise in a corrective manner into the control of the drives or outputs or does not output an alarm message to an operator of the second monitoring device.

The present invention is furthermore based on a first computer program, wherein the first computer program comprises first machine code that is able to be processed directly by a first monitoring device, wherein the effect of the processing of the first machine code by the first monitoring device is that the first monitoring device carries out such a monitoring method.

The present invention is furthermore based on a first monitoring device, wherein the first monitoring device is programmed with such a first computer program, so that the first monitoring device carries out such a monitoring method when it is operating.

Examples of machines in the sense of the present invention are machine tools, production machines and robots.

Machine tools are machines by means of which a tool is at least positioned in a defined way relative to a workpiece and is often also oriented via position-controlled movable elements of the machine tool. The machining mostly involves processing to change contours, in particular processing to machine away contours, for example metal cutting processing. The tool can for example be a drill or a milling cutter. The processing of the workpiece by the tool can be interrupted by periods of time during which the tool is not engaging with the workpiece. Examples of such periods of time are the repositioning of the tool relative to the workpiece and movements for changing the tool. Other movements are also possible, for example manually controlled movements. The movement of the tool relative to the workpiece is undertaken in a machine tool via position-controlled axes. Mostly at least three position-controlled axes are present. However machine tools are also known with more or fewer than three position-controlled axes.

Production machines are other machines that for example only cause workpieces to be relocated from one location to another location. Robots are machines with universal applications.

The movable elements of the machine are moved in particular in a working space of the machine. This is where the danger of collisions arises. Collisions can occur for example between the movable elements of the machine with each other. Collisions between the movable elements and stationary elements are also possible. For example in a machine tool collisions between the tool or a tool holder and the workpiece or a workpiece holder can occur. Collisions with other devices such as for example stationary elements of the machines or measuring devices are also possible. These elements—if necessary including the workpiece—can be seen in a general sense as elements of the machine. In the event of a collision on the one hand significant damage can occur, which already in itself causes high costs. Further the machine must be taken out of operation during such a repair, so that downtimes also occur. Great importance is therefore attached to collision protection.

In the prior art various procedures for avoiding collisions are known. In each case they work by being closely linked to the actual operation of the machine. Many of these methods operate with the support of models. In such methods the individual bodies—in particular the movable or the stationary elements of the machine—are modeled and positioned in accordance with the respective control of the drives in a virtual map. In the event of position-controlled drives, in many models the model operates with position values from the past. In this case, i.e. when the model operates with position values from the past, the model can operate with the position values of the immediately preceding required control of the drives or with the position values of the immediately preceding actual control. In other models the model operates with position values for the future. In this case the model can operate with the position values of the immediately impending required control of the drives. In other methods the actual distances of the various elements of the machine relative to one another are detected and established by a sensors of a wide variety of types. These methods operate without using a model. In any event a danger of a collision is detected if minimum distances between the different elements of the machine are reached or undershot.

The known monitoring methods already generally operate very well. They are not error-free however. A possible cause of errors for example is a gap in an algorithm used for collision avoidance ("an error in reasoning when establishing the algorithm"). A further possible cause of errors is a programming error in the Implementation of the algorithm used ("correctly thought-out but incorrectly used"). Other errors are also possible, for example setting of incorrect parameters for a model of the machine by the manufacturer or an incorrect specification of a setup—in the case of a machine tool for example, of a workpiece or tool setup—by the operator of the machine. In rare individual cases there can also be a failure of the hardware.

Carrying out a simulation of the operation of the machine in advance on the basis of the model of the machine in preparation for operation is known in the prior art. If however the setup on the machine does not exactly match the scenario in the simulation—for example because another tool is being used—collisions can result during real operation of the machine, although the simulation was free from errors. Carrying out the movement of the movable elements in an introductory process manually at low speed is also known in the prior art. In this case at least a lot of time is needed. Furthermore collisions can still occur as a result of inattention or poor visibility.

Modeling the elements of the machine and checking the modeled movement of the movable elements of the machine in parallel to the real movement of the movable elements of the machine to anticipate collisions is also known in the prior art. This method of operation is generally carried out within the control device of the machine. It "depends" on the accuracy and completeness of the model held in the control device. Provided it involves the modeling used by the manufacturer of the machine, this modeling is mostly very good. Often however additional elements have to be modeled by the user and kept up-to-date at all times within the model. Examples of such elements in a machine tool are tool holders, tools, workpieces, workpiece holders, measuring facilities and more besides. When such elements are specified errors often occur.

The object of the present invention is to create possibilities by means of which collisions can be avoided practically with certainty.

A monitoring method of the type stated at the outset is known from WO 2012/080130 A1.

Acquiring the position of elements of the robot in a redundant and diverse manner as part of the enabling of the movement of a robot is known from DE 10 2010 002 250 A1. The acquired positions are compared with positions of elements appearing unexpectedly—of people for example, who are present in the working area of the robot. Both the elements of the robot and also the positions of the elements appearing unexpectedly can be detected in a diverse and redundant manner.

Monitoring actual positions and required positions of elements of a robot for adherence to a maximum following error is known from DE 10 2007 059 481 A1. The actual positions and the required positions are defined in coordinate systems separate from one another. The actual positions and the required positions are transformed into the coordinate system of the other positions in each case. To check the coordinate transformation for correctness there can be a diverse coordinate transformation.

SUMMARY OF THE INVENTION

According to one aspect of the invention, a monitoring method of the type stated at the outset is embodied
  by the first monitoring device carrying out its said functions on the basis of a first computer program and by the second monitoring device carrying out its said functions on the basis of a second computer program
  by the first and the second computer programs being embodied in a diverse manner.

Advantageous embodiments of the monitoring method are the subject matter of the dependent claims.

Because of the diversity of the design of the computer programs—i.e. of program codes that differ from one another—it is guaranteed with all but reasonable certainty that individual malfunctions that occur during the execution of one of the two computer programs and would thus lead to the risk of a collision not being detected do not occur with the other of the two computer programs. It is thereby guaranteed that at least this other computer program will detect the collision in good time and can thus initiate measures to avoid the collision or can output a corresponding alarm message.

The two computer programs can be developed by different programmers (or groups of programmers) for example. It is also possible to set the parameters for the programs separately during their later execution. Also it is possible to supply the parameters to the computer programs in a different manner. Different reactions on detection of a collision or the risk of a collision are also possible.

Hardware faults, e.g. a failure of the available hardware on which the computer programs are being executed, are very rare. It can therefore be tolerable for the two computer programs to be executed by one and the same monitoring device, i.e. for the first monitoring device and the second monitoring device to be one and the same device. Preferably however the first monitoring device and the second monitoring device are different devices from one another. In this case the first monitoring device and the second monitoring device can for their part in particular be constructed in a diverse manner.

In the case of devices differing from one another one of the two monitoring devices can be identical to the control device of the machine for example. The other monitoring device can be embodied in this case as an industrial PC with a data link to the control device of the machine.

It is possible for the first monitoring device to carry out the check as to whether there is a risk of a collision between a movable element of the machine and another movable element of the machine or a stationary element based on a first model of the machine. In this case the first monitoring device checks on the basis of a first model of the machine in conjunction with an immediately preceding or immediately impending required movement of the movable elements of the machine or with an immediately preceding actual movement of the movable elements of the machine, whether there is the risk of such a collision. The same procedure is in principle also possible for the second monitoring device. It is thus possible for the second monitoring device to check on the basis of a second model of the machine, in conjunction with an immediately preceding or immediately impending required movement of the movable elements of the machine or with an immediately preceding actual movement of the movable elements of the machine, whether there is the risk of such a collision. The two models are able to be parameterized by means of respective model parameters. In order to optimize the diversity there is provision in this case however for the second model parameters to be specified to the second model independently of the specification of the first model parameters to the first model.

It is possible for the first model parameters or the second model parameters to be specified in an automated manner to the first or the second model from a first parameter source. "in an automated manner" here means that a person does actually specify the first parameter source but a larger number of first or second model parameters is defined at a stroke by this specification. In this case there can be provision that after the specification of the first or second model parameters to the first or second model, a specification of the second or first model parameters to the second or first model from the first parameter source is blocked. This guarantees that a duplicated automatic specification from the first parameter source is avoided. An automated specification of both the first and also the second model parameters is possible in principle however, but not from the same first parameter source.

The parameterization with the first and second model parameters is done by the manufacturer of the machine. Examples of such parameters for a machine tool are in particular the individual elements of the machine tool, in particular the movable elements of the position-controlled axes and their chaining to one another ("the kinematics of the machine tool") as well as a part of the stationary elements of the machine tool. The first and the second model parameters can no longer be changed later by the user of the machine tool.

The user of the machine tool must also be able to parameterize the models to a certain extent. Examples of such parameters in the case of a machine tool are the geometries of clamping facilities by means of which the workpiece is held, the workpiece itself, measuring devices arranged subsequently in the working space, which tool is used, whether and if necessary which tool extensions or tool holders will be used and more besides. Such parameterization by the user of the machine can be implemented by the first model being able to be parameterized by means of first setup parameters in addition to the first model parameters and by the second model being able to be parameterized by means of second setup parameters in addition to the second model parameters. In a similar way to the first and second model parameters however there is preferably provision for optimizing the diversity for the second setup parameters to be specified to the second model independently of the specification of the first setup parameters to the first model.

In a similar way to the first and second model parameters it is possible for the first of the second setup parameters to be specified to the first or the second model in an automated manner from a second parameter source. "In an automated manner" here means that a person does actually specify the second parameter source but a larger number of first or second setup parameters is defined at a stroke by this specification. In this case there can be provision that after the specification of the first or second setup parameters to the first or second model, a specification of the second or first setup parameters to the second or first model from the first parameter source is blocked. This guarantees that a duplicated automatic specification of the setup parameters from the same second parameter source is avoided. An automated specification of both the first and also the second setup parameters is possible in principle however, but not from the same second parameter source.

As already mentioned, the monitoring by both monitoring devices can be supported by a model. This is not absolutely necessary however. In particular it is also possible as an alternative for one of the two monitoring devices to operate with model support and for the other monitoring device to establish with signals acquired by sensors, without using a model of the machine, distances between the movable and stationary elements of the machine from one another and to detect the risk of a collision when the distances between the movable and stationary elements from one another reach or undershoot predetermined minimum distances. It is also possible for both monitoring devices to make their checks on the basis of signals acquired by sensor without using a model of the machine.

It is possible for the first and the second monitoring device, as part of the check as to whether there is the risk of a collision, exclusively to evaluate the distances of the elements of the machine from one another that they have established. As an alternative it is possible for the first and the second monitoring device, as part of this check, to take account of a speed of movement of the elements of the machine and/or speeds with which the distances reduce.

It is possible for the first and the second monitoring device, for corrective intervention into the control of the drives, to control the same element, for example for both to transfer corresponding signals to the control device of the machine. As an alternative it is possible for the first and the second monitoring device to control different elements of signal chains from one another between the control device and the machine and the electric motors moving the movable elements for this purpose. In particular it is possible for this purpose for one of the two monitoring devices to transfer a first correction signal to the control device of the machine and for the other monitoring device to transfer second correction signals to the drive controls of the machine arranged downstream of the control device but on the other hand upstream of the electric motors.

According to another aspect of the invention, a group of computer programs includes a first and a second computer program, with the first computer program being embodied as explained above. The second computer program comprises second machine code, which is able to be processed directly by a second monitoring device, wherein the effect of the processing of the second machine code by the second monitoring device is that the second monitoring device carries out a monitoring method with the inventive features. The first and the second computer program are embodied here in a diverse manner.

According to still another aspect of the invention, a group of monitoring devices includes a first monitoring device and a second monitoring device with the first monitoring device being embodied as explained above. The second monitoring device is programmed with a second inventive computer program, so that, during operation, the second monitoring device carries out a monitoring method with the inventive features.

Preferably the first and the second monitoring device are different devices from one another. In particular they can be embodied in a diverse manner.

BRIEF DESCRIPTION OF THE DRAWING

The characteristics, features and advantages explained above as well as the manner in which these are achieved will become clearer and easier to understand in conjunction with the description given below of the exemplary embodiments, which are explained in greater detail in conjunction with the drawings. In the drawings, in schematic diagrams.

DETAILED DESCRIPTION OF PREFERRED EMBODIMENTS

The present invention will be explained below in conjunction with a machine tool. It is not restricted to machine tools however. Instead the present invention can be applied in general to machines in which elements are moved by drives. Examples of such machines are robots, production machines and more besides. The present invention will furthermore be explained below in conjunction with a movement of elements of the machine tool with position-controlled drives. It is not restricted to a movement of elements by position-controlled drives however. Even if the present invention is always explained below in conjunction with a machine tool and position-controlled drives, the information given also applies to other machines and also to non-position-controlled drives.

In a machine tool a workpiece 2 is generally to be processed by means of a tool 1. For this purpose the workpiece 2 is clamped in a workpiece holder 3. Then a control device 4 controls a number of position-controlled drives 5 of the machine tool, so that the tool 1 is moved relative to the workpiece 2 along a predefined path. The tool 1 is thus at least translationally positioned along the path. In many cases the workpiece 1 is also rotationally oriented. Furthermore the tool 1 is controlled appropriately by the control device 4 where necessary, so that it carries out the required processing. The tool 1 is often a rotating tool for example, for example a milling cutter or a drill. For rotating the tool 1 a further drive is present, which is likewise controlled by the control device 4. It is possible for this drive not to be position-controlled, but only to be speed-controlled or be operated under speed control. Position-controlled operation is also possible, however. This drive is of secondary importance within the framework of the present invention and is therefore not shown as well in FIG. 1 (and also in the other figures). Other movements are also possible, for example manually controlled movements and indeed automatically executed movements, but movements that do not correspond to a processing of the workpiece 2 by the tool 1.

Figure 1:
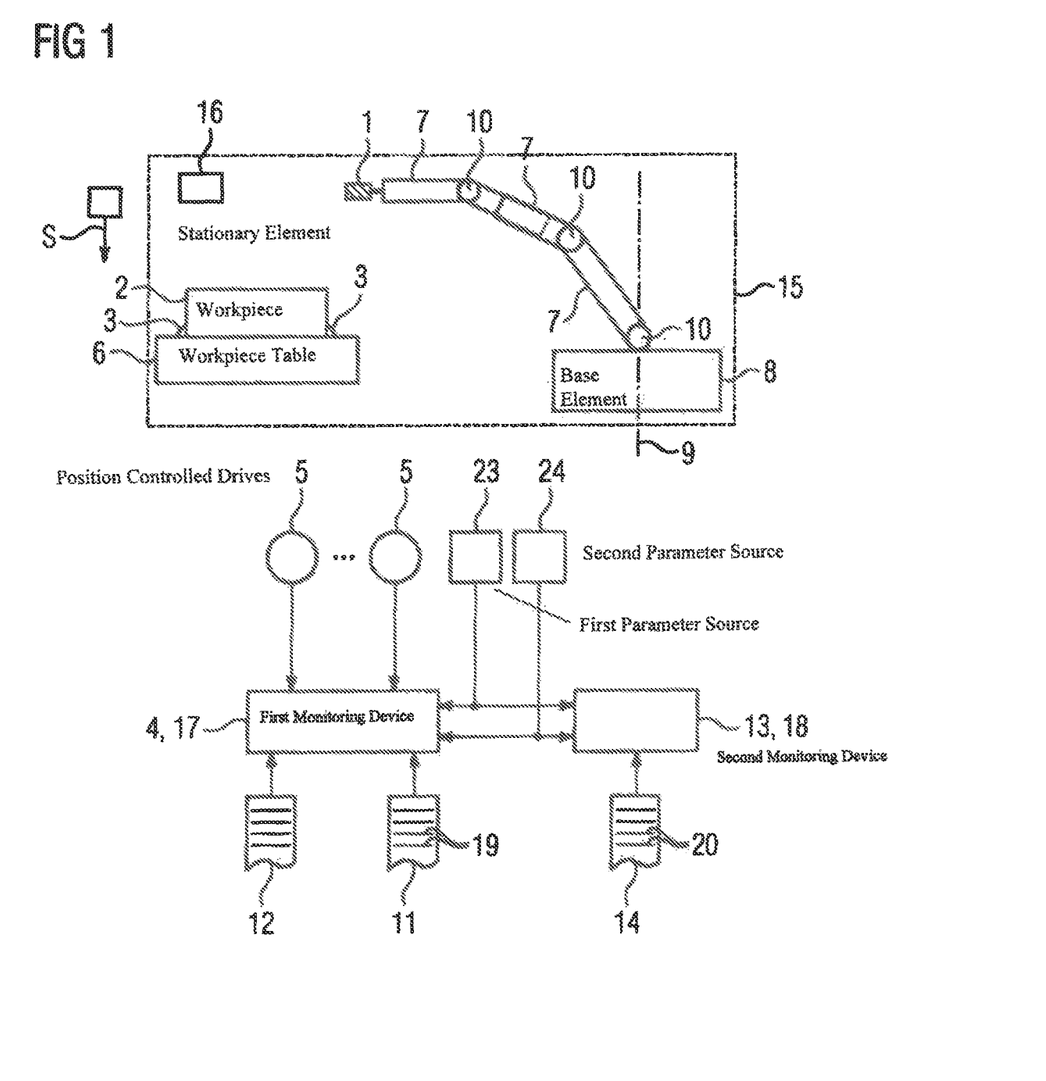
FIG. 1 shows a machine tool including associated components.

The position-controlled drives 5 can act as required on movable elements of the machine tool. For example a workpiece table 6, on which the workpiece holder 3 is arranged, can be rotated. In this case the workpiece holders 3 and the workpiece 2 are also moved indirectly via the movement of the workpiece table 6. As an alternative or in addition outriggers 7 can be moved, wherein the tool 1 is attached to the last outrigger 7. In this case the tool 1 and also a tool holder not shown are also moved indirectly via the movements of the outriggers 7. Three outriggers 7 are present purely by way of example, wherein likewise purely by way of example a base element 8 to which the next outrigger 7 is attached, is able to be rotated about the vertical 9, the outriggers 7 are each pivotable in a joint 10 and in addition the central outrigger 7 is adjustable in its length. This configuration is however purely by way of example and has only been chosen in order to be able to clearly explain the invention.

The control device 4 is software programmable as a rule. Its principle mode of operation is determined by a system program 11. Inter alia the processing of the system program 11 can cause the control device 4 to process a subprogram 12, which for its part determines and defines a movement ("path") of the tool 1 relative to the workpiece 2. The control device 4 implements at least the functionality of a numerical control (CNC). In some cases it additionally implements the functionality of a programmable logic controller (PLC). A movement of movable elements of the machine tool is likewise possible via a programmable logic controller. However these types of movements—by contrast to the movement of the tool 1 relative to the workpiece 2—are not undertaken using position control.

The control device 4 often has a data link to a further processing device 13, for example an industrial PC. The industrial PC 13 is programmed with a further computer program 14.

The occurrence of collisions is to be avoided, for example a collision of the central outrigger 7 with the base element 8, the workpiece holder 3 or another movable element of the machine tool or another stationary element 16. The stationary element 16 can in particular be arranged in a working space 15 of the machine tool. In general a collision between bodies at risk of collision with one another is to be avoided. This applies both during the movement of the tool 1 relative to the workpiece 2 and also at other times. For this purpose (at least) two monitoring devices 17, 18 are present. The monitoring devices 17, 18 can be constructed in the same way in individual cases. As a rule however they are constructed in a diverse manner. For example one of the two monitoring devices 17, 18 can be identical to the control device 4 of the machine tool and the other of the two monitoring devices 17, 18 can correspond to the industrial PC 13. As an alternative other devices can be involved, i.e. devices that differ both from the control device 4 and also from the industrial PC 13. The monitoring device 17 will be referred to below as the first monitoring device, the monitoring device 18 as the second monitoring device. It is furthermore assumed that the monitoring device 17 is identical to the control device 4 of the machine tool and the monitoring device 18 is embodied as an industrial PC 13. These assignments are however purely by way of example and could also be different.

As a result of the assignment made the system program 11 corresponds to a first computer program, the computer program 14 to a second computer program. Both computer programs 11, 14 comprise a respective machine code 19, 20, which is able to be processed directly by the respective monitoring device 17, 18. The processing of the respective machine code 19, 20 by the respective monitoring device 17, 18 causes the respective monitoring device 17, 18 to carry out a respective sub-monitoring method for the movement of the movable elements 1 to 3, 6 to 8, 10. Together the monitoring devices 17, 18 thereby carry out an overall monitoring method for the movement of the elements 1 to 3, 6 to 8, 10. The two sub-monitoring methods will be explained in greater detail below.

Figure 2:
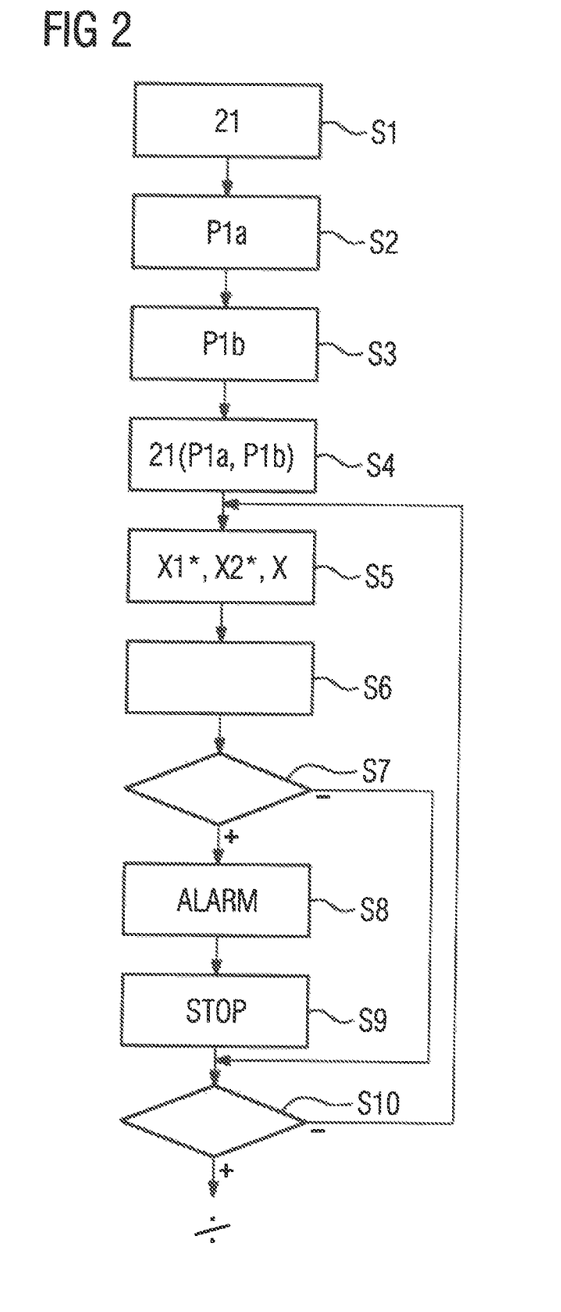
FIG. 2 shows a flow diagram.

FIG. 2 shows the method of operation of the first computer program 11 (in as far as it applies to the inventive monitoring method). In accordance with FIG. 2 (see FIG. 3 for more information) the first monitoring device 17, in a step S1, implements a model 21 of the machine tool. The model 21 will be referred to below as the first model. The first model 21 in particular models the existing mechanical elements 1 to 3, 6 to 8, 10 of the machine tool and their movements. The modeled elements 1 to 3, 6 to 8, 10 comprise the tool 1, the tool holder, the workpiece 2, the workpiece holder 3, the workpiece table 6, the outriggers 7, the base element 8 and the joints 10. In addition other movable elements and also stationary elements 16 of the machine tool are modeled as required. The modeling as such is generally known and familiar to persons skilled in the art.

Figure 3:
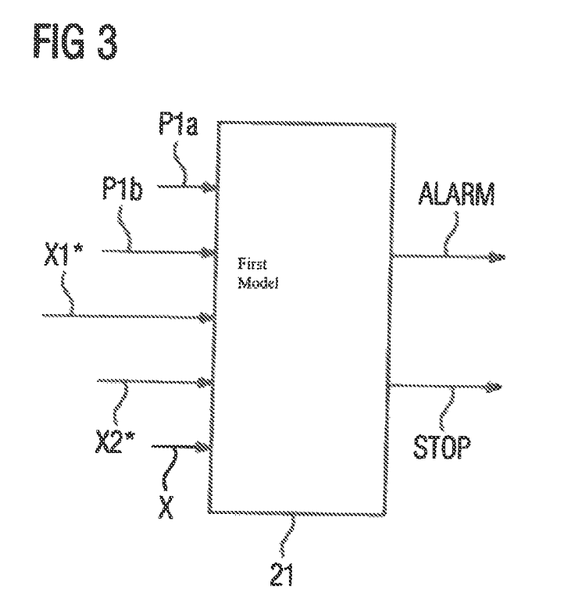
FIG. 3 shows a model.

As a rule, for correct modeling, the first monitoring device 17 is supplied with first model parameters P1$a$ in a step S2. The first model parameters P1$a$ are as a rule supplied to the first monitoring device 17 by a manufacturer of the machine tool. As a rule they are not able to be changed by a user or operator of the machine tool. For example the first model parameters P1$a$ can be held in a memory (not shown in the figure) of the first monitoring device 17, to which write access is only possible after providing a predetermined password. By means of the first model parameters P1$a$ those elements of the machine tool are modeled with which the machine tool is provided by the manufacturer of the machine tool. Examples of such components are in particular the workpiece table 6, the base element 8, the outriggers 7 and the joints 10.

In a step S3 first setup parameters P1$b$ are supplied to the first monitoring device 17. As a rule the first setup parameters P1$b$ are supplied to the first monitoring device 17 by the user or operator of the machine tool. As a rule the first setup parameters P1$b$ are able to be changed at any time by the user or operator of the machine tool. By means of the first setup parameters P1$b$ those elements of the machine tool are modeled with which the machine tool is provided by the user or operator of the machine tool. Examples of such elements are often the tool holder, the workpiece holder 3, the workpiece 2, any measuring devices and others as well. The user can also define which tool 1 is used in each case.

In a step S4 the first monitoring device 17 parameterizes the first model 21 in accordance with the predetermined first model parameters P1$a$ and first setup parameters P1$b$.

In a step S5 the first monitoring device 17 accepts position values X1\*, X2\*, X. In a step S6 the first monitoring device 17 establishes on the basis of the first model 21 of the machine tool in conjunction with the accepted position values X1\*, X2\*, X, the distances of the modeled elements 1 to 3, 6 to 8, 10 of the machine tool from one another produced. It takes account here of the first model parameters P1$a$ and the first setup parameters P1$b$. In evaluating the step S6, the first monitoring device 17 checks in a step S7 whether there is a risk of a collision of an element 1 to 3, 6 to 8, 10 of the machine tool with another element 1 to 3, 6 to 8, 10 of the machine tool.

The check as to whether there is a risk of a collision is generally known to those skilled in the art. For example a collision or the risk of a collision can be detected if distances of elements 1 to 3, 6 to 8, 10 from one another fall below minimum distances. An exception here can apply to the distance from tool 1 to workpiece 2. In particular the workpiece 2 is often to be processed by the tool 1 by having material removed from it. In this case contact between the tool 1 and the workpiece 2 is required as a rule. With regard to the distance between tool 1 and workpiece 2 the point at which where necessary contact between tool 1 and workpiece 2 occurs can be checked for example as to whether at this point processing of workpiece 2 by tool 1 is to take place and whether specific operating parameters of the machine tool such as for example a speed of the tool 1 and the speed of advance of the tool 1 relative to the workpiece 2 fulfill predetermined technological parameters. In this case, despite a "collision" of the tool 1 with the workpiece, no collision will be detected, since it is precisely this processing that is to occur. However, as already mentioned, this exception only applies to the contact between tool 1 and workplace 2. Taking account of the processing of the workpiece 2 by the tool 1 within the framework of collision checking is likewise generally known to the person skilled in the art. It is also generally known to those skilled in the art that the description of the workpiece 2 is continuously adjusted and updated within the first model 21 according to the processing by the tool 1.

If an impending collision is detected the first monitoring device 17 goes to a step S8. In step S8 the first monitoring device 17 outputs an alarm message. For example the alarm message can be output to the user or the operator of the machine tool. In a subsequent step S9 first monitoring device 17 makes a corrective intervention into the control of the drives 5. This will be discussed in greater detail later. Otherwise the first monitoring device 17 skips the steps S8 and S9. In some cases it is exclusively the step S8 that is present, in some cases exclusively the step S9. In yet other cases both the step S8 and also the step S9 are present.

In a step S10 the first monitoring device 17 checks whether a termination condition has occurred. If this is not the case, the first monitoring device 17 goes back to step S5. In the renewed execution of step S5 the first monitoring device 17 accepts the next position values X1\*, X2\*, X. Otherwise the procedure of FIG. 2 is either ended or the first monitoring device 17 goes to step S3, in which—for example because of a change of the tool 1 or of the workpiece 2—the first setup parameters P1$a$ are specified to it again.

It Is possible for the position values X1\*, X2\*, X of the step S5 to be actual position values X, which are related to a specific period of time before the point in time being considered and in particular immediately before the point in time being considered. In this case the steps S5 to S9 must be carried out in real time together with the actual control of the position-controlled drives 5. If the risk of a collision is detected, the reaction must be immediate intervention into the control of the drives 5.

As an alternative it is possible for the position values X1\*, X2\*, X of the step S5 to be required position values X1\*, which are related to a specific period of time before the point in time being considered and in particular immediately before the point in time being considered. Likewise it is possible for the position values X1\*, X2\*, X of the step S5 to be required position values X2\*, which are related to a specific period of time after the point in time being considered and in particular immediately after the point in time being considered. In these cases too the steps S5 to S9 can be carried out in real time together with the actual control of the position-controlled drives 5. If this is the case the risk of a collision is detected, the reaction must likewise be immediate intervention into the control of the drives 5. As an alternative, in the event of the evaluation of position values X1\*, X2\*, X, it is however likewise possible to carry out the steps S5 to S9 decoupled in time from the actual control of the position-controlled drives 5. In this case it is sufficient for the reaction to detecting the risk of a collision to be to output the alarm message.

Independently of the first monitoring device 17 the second monitoring device 18 likewise carries out a check as to whether there is the risk of a collision of an element 1 to 3, 6 to 8, 10, 16 of the machine tool with another element 1 to 3, 6 to 8, 10, 16 of the machine tool. Depending on whether the second monitoring device 18 detects the risk of a collision or not, the second monitoring device 18 reacts in a similar manner. In particular the second monitoring device 18, in the event of there being a risk of a collision of an element 1 to 3, 6 to 8, 10, 16 of the machine tool with another element 1 to 3, 6 to 8, 10, 16 of the machine tool, can output an alarm message as required and/or intervene correctively into the control of the drives 5. Here too a "collision" can be allowed if necessary for the processing of the workpiece 2 by the tool 1.

Figure 4:
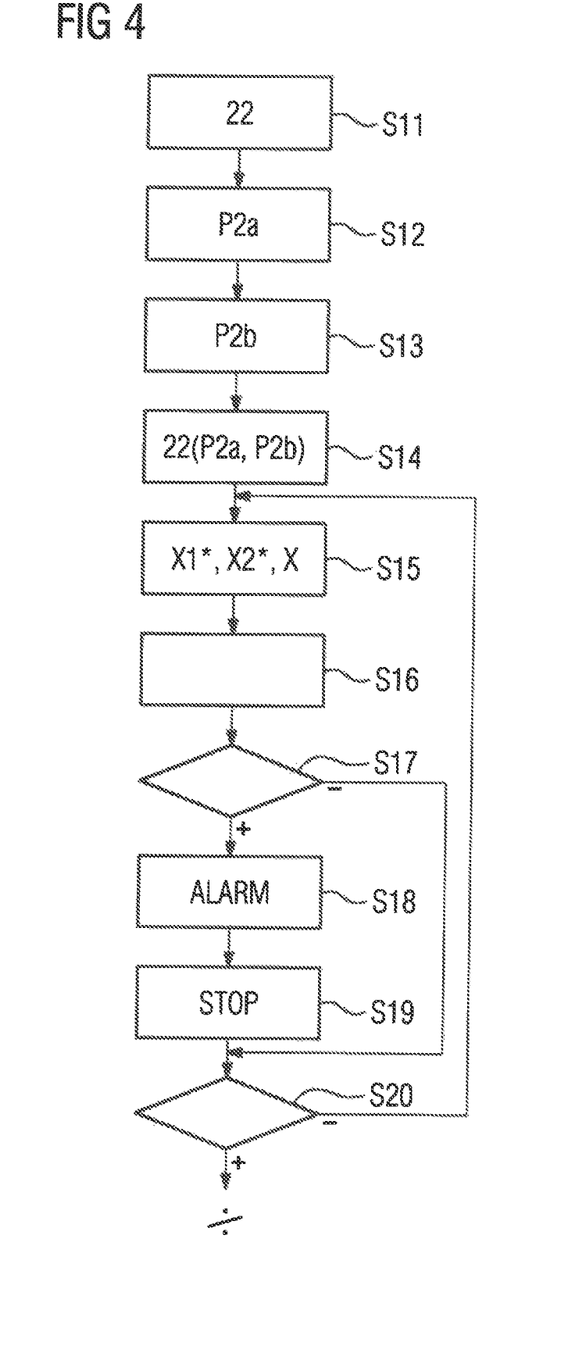
FIG. 4 shows a flow diagram.
Figure 5:
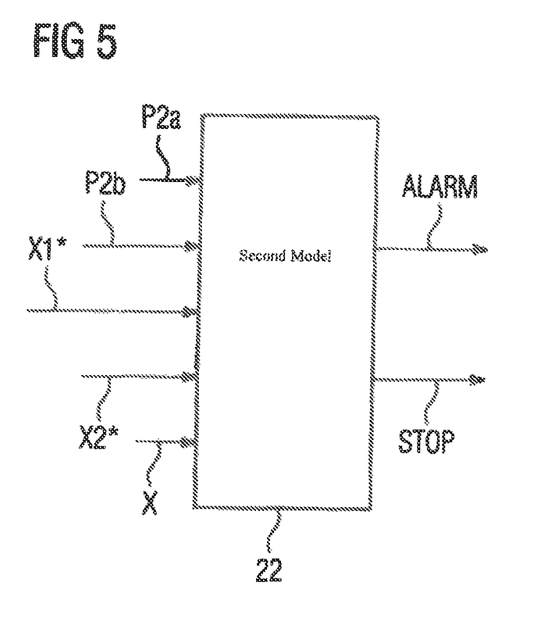
FIG. 5 shows a model.

For example it is possible in accordance with the diagram shown in FIGS. 4 and 5 for the second monitoring device 18, in a step S11, to implement a second model 22 and in steps S12 to S14 to parameterize it with the model parameters P2$a$ and the setup parameters P2$b$ and then, in steps S15 to S20, to implement a process equivalent to the process explained above in conjunction with FIGS. 2 and 3. The steps S11 to S20 can correspond 1:1 in respect of functions to the steps S1 to S10 of FIG. 2.

As an alternative it is possible for the first and/or the second monitoring device 17, 18 to carry out a monitoring method that will be explained in greater detail below in conjunction with FIG. 6. The monitoring method of FIG. 6 will be explained here in conjunction with the first monitoring device 17. It is however—both as an alternative and also in addition—also applicable to the second monitoring device 18.

Figure 6:
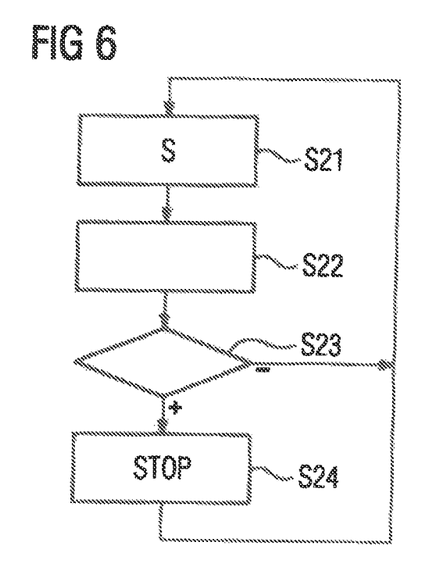
FIG. 6 shows a flow diagram.

The monitoring method of FIG. 6—by contrast with the monitoring methods of FIG. 2 or 4—can only be carried out during the control of the drives by the control device 4. Within the framework of the monitoring method of FIG. 6 signals S are detected by means of corresponding sensors (see FIG. 1)—for example cameras or radar transmitters and receivers, which show the elements 1 to 3, 6 to 8, 10, 16 of the machine tool. The signals S are accepted in a step S21 by the first monitoring device 17 by processing the associated computer program 11. In a step S22 the first monitoring device 17 establishes, on the basis of the signals detected by the sensors, distances between the elements 1 to 3, 6 to 8, 10, 16 of the machine tool from one another. The establishment process of step S22 can be done without use of a model of the machine tool. In a step S23 the first monitoring device 17 detects the danger of a collision when the distances of the elements 1 to 3, 6 to 8, 10, 16 from one another reach or undershoot predetermined minimum distances. Here too the exception of a desired processing of the workpiece 2 by the tool 1 can again be allowed. If the first monitoring device 17 detects the danger of a collision in step S23, it goes to a step S24, in which it makes a corrective intervention into the control of the drives 5. The step S24 corresponds in its content to the step S9 of FIG. 2.

Independently of whether a monitoring method in accordance with FIG. 2 or FIG. 4 or a monitoring method in accordance with FIG. 6 is implemented, the second computer program 14 is embodied in a manner that diverges from the first computer program 11. The two computer programs 11, 14 are thus developed independently from one another and therefore comprise machine code 19, 20, which implements algorithms that differ from one another.

In particular when a monitoring method in accordance with FIG. 2 is implemented by means of the first monitoring device 17 and a monitoring method in accordance with FIG. 4 is implemented by means of the second monitoring device 18, different embodiments are possible.

Thus it is possible for example that by the manner in which the first and second model parameters P1a, P2a are specified, it is guaranteed that the second model parameters P2a are specified to the second model 22 independently of the specification of the first model parameters P1a to the first model 21. This is explained below in greater detail in conjunction with FIG. 7.

Figure 7:
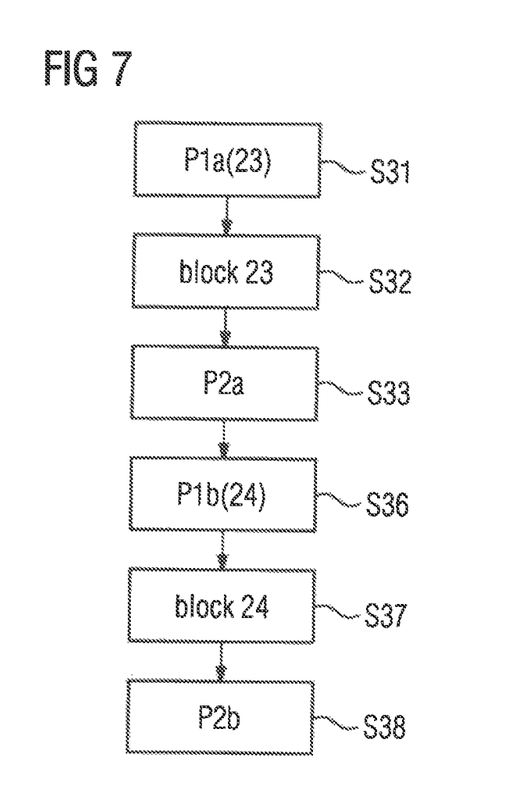
FIG. 7 shows a flow diagram.

In accordance with FIG. 7, the first model parameters P1a are specified to the first model 21 in a step S31. They can be specified manually. As an alternative they can be specified from a first parameter source 23. In this case an operator only has to specify the first parameter source 23 as such. By contrast the first model parameters P1a are accepted by the first model 21 automatically. When they are specified from the first parameter source 23, a step S32 is preferably additionally present. In step S32 a specification of the second model parameters P2a to the second model 22 from the first parameter source 23 is blocked. Then, in a step S33, the second model parameters P2a are specified to the second model 22. Here too a manual specification is again possible. An automated specification is also possible. This specification cannot be from the first parameter source 23 however, since this has been blocked in step S32. Thus, in the case of an automated specification, this must involve another parameter source. This other parameter source is not shown in the figure.

In a similar manner it is possible that by the manner in which the first and second setup parameters P1b, P2b are specified, it is guaranteed that the second setup parameters P2b are specified to the second model 22 independently of the specification of the first model parameters P1b to the first model 21. This is also explained below in greater detail in conjunction with FIG. 7.

In accordance with FIG. 7, the first setup parameters P1b are specified to the first model 21 in a step S36. They can be specified manually. As an alternative they can be specified automatically from a second parameter source 24. When they are specified from the second parameter source 24, a step S37 is preferably additionally present. In step S37 a specification of the second setup parameters P2b to the second model 22 from the first parameter source 24 is blocked. Then, in a step S33, the second setup parameters P2b are specified to the second model 22. Here too a manual specification is again possible. An automated specification is also possible. This specification cannot be from the second parameter source 24 however, since this has been blocked in step S37. Thus, in the case of an automated specification, this must involve another parameter source. This other parameter source is not shown in the figure.

It has been explained above that first of all the first model parameters P1a and/or the first setup parameters P1b are specified to the first monitoring device 17 and only thereafter are the second model parameters P2a and/or the second setup parameters P2b specified to the second monitoring device 18. Naturally the reverse order is also possible. The only decisive factor is that the first and second model parameters P1a, P2a are specified independently of one another and where necessary the first parameter source 23, after it has been used for the specification of one of the model parameters P1a, P2a, is blocked for the specification of the model parameters P2a, P1a specified later. The same applies to the specification of the first and second setup parameters P1b, P2b.

Figure 8:
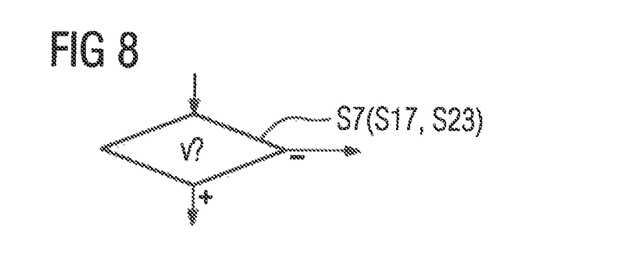
FIG. 8 shows a flow diagram.

It Is possible for the first monitoring device 17, within the framework of the checking of step S7, exclusively to consider the established distances of the different elements 1 to 3, 6 to 8, 10, 16 of the machine tool from one another. As an alternative, it is possible, according to the diagram shown in FIG. 8, that in step S7 a speed of movement v of the elements 1 to 3, 6 to 8, 10, 16 of the machine tool and or speeds with which the distances of the elements 1 to 3, 6 to 8, 10, 16 of the machine tool from each other reduce is taken into consideration. The same applies to the steps S17 or S23.

Figure 9:
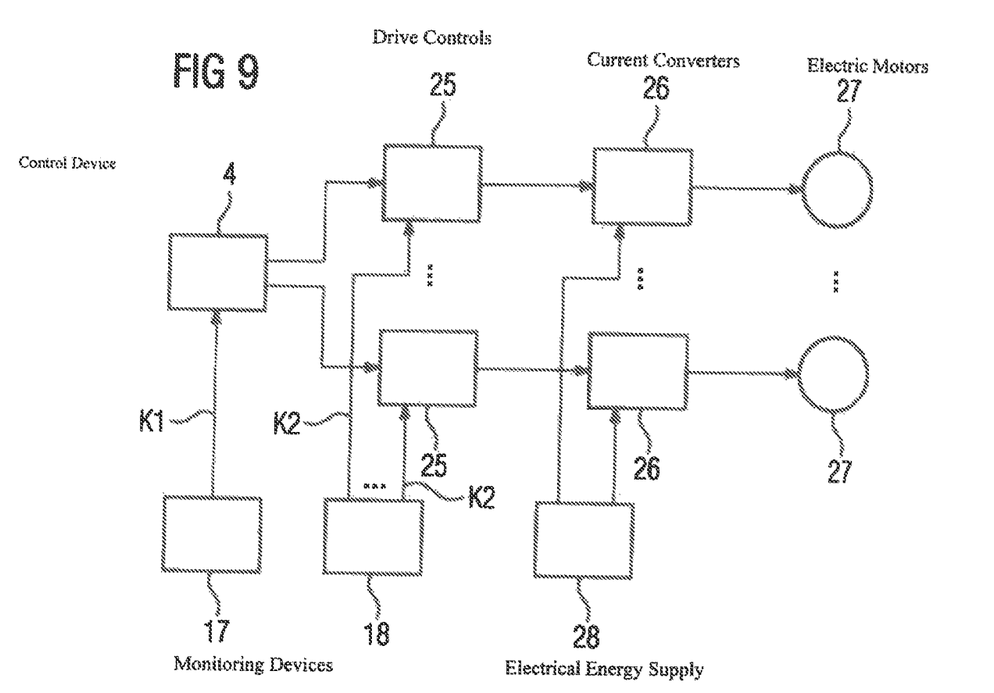
FIG. 9 shows signal chains.

The control device 4 controls the position-controlled drives 5 via predetermined signal chains. For example the control device 4 can, according to the diagram in FIG. 9, output position, speed or required torque values to subordinate drive controls. The drive controls 25 in their turn control current converters 26, wherein the current converters 26 in their turn connect electric motors 27 via an internal power controller to an electrical energy supply 28. By the corresponding control of the electric motors 27 the tool 1 is positioned relative to the workpiece 2 or is moved in general. If both monitoring devices 17, 18 intervene correctively in the control of the drives 5, the first and the second monitoring devices 17, 18 preferably control different elements 4, 25, 26 of these signal chains (including the limits of these signal chains) in accordance with the diagram in FIG. 9. For example one of the two monitoring devices 17, 18 can transfer a first correction signal K1 to the control device 4 of the machine tool, while the other of the two monitoring devices 17, 18 transfers correction signals K2 to the drive controls 25 for the same purpose.

In summary the present invention thus relates to the following subject matter:

Movable elements 1 to 3, 6 to 8, 10 of a machine are moved by a control device 4 of the machine by controlling drives 5 of the machine. To monitor the movement of the movable elements 1 to 3, 6 to 8, 10 for collisions with one another or with a stationary element 16, a number of monitoring devices 17, 18 check independently of one another, as a result of the execution of a respective computer program 11, 14, whether there is a risk of a collision between a movable element 1 to 3, 6 to 8, 10 of the machine tool and another movable element 1 to 3, 6 to 8, 10 of the machine tool or with a stationary element 16. Depending on whether or not the monitoring devices 17, 18 detect the risk of a collision, they intervene correctively independently of one another in the control of the drives 5 or do not output or output an alarm message t independently of one another. The two computer programs 11, 14 are embodied in a diverse manner from one another.

The present invention has many advantages. In particular by using diverse computer programs 11, 14 a collision can be detected with all but reasonable certainty in good time. An expansion by a functionality is even possible—and this is possible for both monitoring devices 17, 18 independently of one another—such that in the event of a collision no longer being able to be prevented, measures are taken to minimize any damage that might occur.

Although the invention has been illustrated and described in greater detail by the preferred exemplary embodiment, the invention is not restricted by the disclosed examples and other variations can be derived herefrom by the person skilled in the art, without departing from the scope of protection of the invention.

What is claimed is:

1. A method for monitoring a movement of movable elements of a machine, said method comprising:
    controlling drives of the machine by a control device of the machine to move the movable elements;
    checking with a first monitoring device by executing a first computer program whether there is a risk of a collision between a movable element of the machine and another movable element of the machine or with a stationary element, and depending on whether or not the first monitoring device detects a danger of a collision, the first monitoring device intervenes or does not intervene in a corrective manner in the control of the drives or outputs or does not output an alarm message to an operator of the first monitoring device;
    checking with a second monitoring device which is different from the first monitoring device and embodied in a diverse manner from the first monitoring device, by executing a second computer program, the second computer program embodied in a diverse manner from the first computer program, whether there is a risk of a collision between a movable element of the machine and another movable element of the machine or with a stationary element, and depending on whether or not the second monitoring device detects a danger of a collision, the second monitoring device intervenes or does not intervene in a corrective manner in the control of the drives or outputs or does not output an alarm message to an operator of the second monitoring device,
    wherein one of the first and second monitoring devices is identical to the control device of the machine, and the other one of the first and second monitoring devices is embodied as an industrial PC with a data link to the control device of the machine.

2. The method of claim 1, wherein the checking with the first monitoring device is on the basis of a first model of the machine, in conjunction with an immediately preceding or immediately impending required movement of the movable elements of the machine or an immediately preceding actual movement of the movable elements of the machine, whether there is the risk of a collision between the movable element of the machine and another movable element of the machine or the stationary element, the first model of the machine parameterized by first model parameters, the first model parameters specified to the first model, and wherein the checking with the second monitoring device is on the basis of a second model of the machine, in conjunction with an immediately preceding or immediately impending required movement of the movable elements of the machine or the immediately preceding actual movement of the movable elements of the machine, whether there is the risk of a collision of the movable element of the machine with another movable element of the machine or the stationary element, the second model of the machine parameterized by second model parameters, the second model parameters specified to the second model independently of the specification of the first model parameters to the first model.

3. The method of claim 2, wherein the specifying of the first or the second model parameters to the first or the second model is in an automated manner from a first parameter source and wherein after the specification of the first or the second model parameters to the first or the second model, a specification of the second or the first model parameters to the second or the first model from the first parameter source is blocked.

4. The method of claim 3, wherein the specifying of the first or the second setup parameters to the first or the second model is in an automated manner from a second parameter source and wherein after the specification of the first or the second setup parameters to the first or the second model, a specification of the second or the first setup parameters to the second or the first model from the second parameter source is blocked.

5. The method of claim 2, further comprising:
    parameterizing by first setup parameters the first model, in addition to the first model parameters;
    parameterizing by second setup parameters the second model, in addition to the second model parameters; and
    specifying the second setup parameters to the second model independently of the specification of the first setup parameters to the first model.

6. The method of claim 1, further comprising:
    establishing by the first monitoring device, on the basis of signals acquired by sensors, without using a model of the machine, distances of the movable and stationary elements of the machine from one another and detecting the danger of a collision if the distances of the movable and stationary elements from one another reach or undershoot minimum distances, and/or
    establishing by the second monitoring device, on the basis of signals acquired by sensors, without using a model of the machine, distances of the movable and stationary elements of the machine from one another and detecting the danger of a collision if the distances of the movable and stationary elements from one another reach or undershoot minimum distances.

7. The method of claim 1, further comprising taking into consideration by the first and/or the second monitoring device, as part of the checking whether there is a risk of a collision, a speed of the movable and stationary elements of the machine and/or speeds with which the distances of the movable and stationary elements of the machine from one another are reducing.

8. The method of claim 1, further comprising controlling by the first and/or the second monitoring device, different elements from one another of signal chains between the control device of the machine and electric motors moving the movable elements, for the corrective intervention in the control of the drives.

9. The method of claim 8, further comprising:
transferring a first correction signal to the control device of the machine by the first and/or the second monitoring device, for corrective intervention into the control of the drives; and
transferring second correction signals to drive controls of the machine arranged downstream of the control device but upstream of the electric motors by the second or the first monitoring device, for corrective intervention into the control of the drives.

10. A group of monitoring devices for monitoring a movement of movable elements of a machine, the movable elements moved by a control device of the machine by controlling drives of the machine, the group of monitoring devices comprising:
a first monitoring device programmed with a first computer program to execute the steps of checking by executing the first computer program, whether there is a risk of a collision between a movable element of the machine and another movable element of the machine or with a stationary element, and depending on whether or not the first monitoring device detects a danger of a collision, the first monitoring device intervenes or does not intervene in a corrective manner in the control of the drives or outputs or does not output an alarm message to an operator of the first monitoring device;
a second monitoring device different from the first monitoring device and embodied in a diverse manner from the first monitoring device and programmed with a second computer program that differs form the first computer program to execute the steps of checking by executing the second computer program, whether there is a risk of a collision between a movable element of the machine and another movable element of the machine or with a stationary element, and depending on whether or not the second monitoring device detects a danger of a collision, the second monitoring device intervenes or does not intervene in a corrective manner in the control of the drives or outputs or does not output an alarm message to an operator of the second monitoring device,
wherein one of the first and second monitoring device is identical to the control device of the machine and the other one of the first and second monitoring devices is embodied as an industrial PC with a data link to the control device of the machine.

* * * * *